(12) United States Patent
Suzuki et al.

(10) Patent No.: US 10,696,292 B2
(45) Date of Patent: Jun. 30, 2020

(54) HYBRID VEHICLE

(71) Applicant: ISUZU MOTORS LIMITED, Shinagawa-ku, Tokyo (JP)

(72) Inventors: Haruo Suzuki, Chigasaki (JP); Hiroki Seto, Chigasaki (JP); Ryou Morimoto, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 16/097,208

(22) PCT Filed: Apr. 27, 2017

(86) PCT No.: PCT/JP2017/016668
§ 371 (c)(1),
(2) Date: Oct. 26, 2018

(87) PCT Pub. No.: WO2017/188359
PCT Pub. Date: Nov. 2, 2017

(65) Prior Publication Data
US 2019/0135269 A1 May 9, 2019

(30) Foreign Application Priority Data

Apr. 27, 2016 (JP) .................................. 2016-089640

(51) Int. Cl.
*B60W 20/40* (2016.01)
*B60K 6/48* (2007.10)
(Continued)

(52) U.S. Cl.
CPC .............. *B60W 20/40* (2013.01); *B60K 6/28* (2013.01); *B60K 6/387* (2013.01); *B60K 6/40* (2013.01);
(Continued)

(58) Field of Classification Search
CPC ...... B60W 20/40; B60W 10/02; B60W 20/17; B60W 30/194; B60W 20/20; B60W 10/06;
(Continued)

(56) References Cited

U.S. PATENT DOCUMENTS

| 7,096,840 B2 * | 8/2006 | Asada ..................... F02N 11/08 123/179.3 |
| 2005/0237033 A1 * | 10/2005 | Shirakawa ............... B60K 6/26 322/28 |

(Continued)

FOREIGN PATENT DOCUMENTS

DE   10 2009 043 243 A1   5/2010
DE   10 2012 009 481 A1   11/2013
(Continued)

OTHER PUBLICATIONS

Extended European Search Report for corresponding EP Patent Application No. 17789641.2, dated Mar. 7, 2019, in 7 pages.
(Continued)

*Primary Examiner* — Russell Frejd
(74) *Attorney, Agent, or Firm* — Procopio, Cory, Hargreaves & Savitch LLP

(57) ABSTRACT

In the present invention, when an engine of a hybrid vehicle is in a cooled state, a control device 70 thereof performs control so as to disengage an engine clutch 14 configured from a wet multi-disc clutch and supply electrical power to a motor generator 21 from a high-voltage battery 24 to rotationally drive the motor generator 21 in order to agitate clutch oil 86 in the engine clutch 14 and raise the temperature thereof.

6 Claims, 3 Drawing Sheets

(51) Int. Cl.
| | |
|---|---|
| *B60W 10/02* | (2006.01) |
| *B60K 6/54* | (2007.10) |
| *B60L 50/16* | (2019.01) |
| *B60W 20/17* | (2016.01) |
| *B60W 30/194* | (2012.01) |
| *B60W 20/20* | (2016.01) |
| *B60W 10/06* | (2006.01) |
| *B60W 20/13* | (2016.01) |
| *B60W 30/19* | (2012.01) |
| *B60W 10/26* | (2006.01) |
| *B60W 10/08* | (2006.01) |
| *B60K 6/28* | (2007.10) |
| *B60K 6/387* | (2007.10) |
| *B60K 6/40* | (2007.10) |
| *B60K 11/02* | (2006.01) |
| *B60W 30/20* | (2006.01) |

(52) U.S. Cl.
CPC ............... *B60K 6/48* (2013.01); *B60K 6/54* (2013.01); *B60K 11/02* (2013.01); *B60L 50/16* (2019.02); *B60W 10/02* (2013.01); *B60W 10/023* (2013.01); *B60W 10/06* (2013.01); *B60W 10/08* (2013.01); *B60W 10/26* (2013.01); *B60W 20/13* (2016.01); *B60W 20/17* (2016.01); *B60W 20/20* (2013.01); *B60W 30/19* (2013.01); *B60W 30/194* (2013.01); *B60K 2006/4825* (2013.01); *B60W 2030/203* (2013.01); *B60W 2510/0208* (2013.01); *B60W 2510/0291* (2013.01); *B60W 2510/0676* (2013.01); *B60W 2510/244* (2013.01); *B60W 2555/20* (2020.02); *B60W 2710/021* (2013.01); *B60W 2710/029* (2013.01); *B60W 2710/0688* (2013.01); *B60W 2710/08* (2013.01); *B60Y 2200/92* (2013.01); *Y02T 10/6221* (2013.01); *Y02T 10/7077* (2013.01)

(58) Field of Classification Search
CPC ...... B60W 20/13; B60W 30/19; B60W 30/10; B60W 30/26; B60W 10/08; B60W 10/023; B60W 2555/20; B60W 2510/0208; B60W 2710/0688; B60W 2710/08; B60W 2710/203; B60W 2710/203; B60W 2710/029; B60W 2510/0291; B60W 2510/0676; B60W 2510/244; B60W 2710/021; B60K 6/54; B60K 6/28; B60K 6/387; B60K 6/40; B60K 11/02; B60K 6/48; B60K 2006/4825; B60L 50/16; Y02T 10/7077; Y02T 10/6221; B60Y 2200/92

See application file for complete search history.

(56) References Cited

U.S. PATENT DOCUMENTS

| | | | |
|---|---|---|---|
| 2007/0272456 A1* | 11/2007 | Shiiba | B60K 6/48 180/65.275 |
| 2014/0129119 A1 | 5/2014 | Park | |
| 2014/0136039 A1* | 5/2014 | Tanishima | B60K 6/48 701/22 |
| 2016/0090000 A1* | 3/2016 | Eifert | B60L 11/1861 320/148 |
| 2019/0135269 A1* | 5/2019 | Suzuki | B60W 10/023 |

FOREIGN PATENT DOCUMENTS

| | | | |
|---|---|---|---|
| JP | 2002-089417 A | | 3/2002 |
| JP | 2002089417 A | * | 3/2002 |
| JP | 2002-238105 A | | 8/2002 |
| JP | 2012-086803 A | | 5/2012 |

OTHER PUBLICATIONS

International Search Report and Written Opinion for related International Application No. PCT/JP2017/016668, dated Jul. 11, 2017; English translation of ISR provided; 7 pages.
Office Action for related EP App. No. 17789641.2-1012 dated Apr. 24, 2020; 5 pages.

* cited by examiner

[FIG. 1]
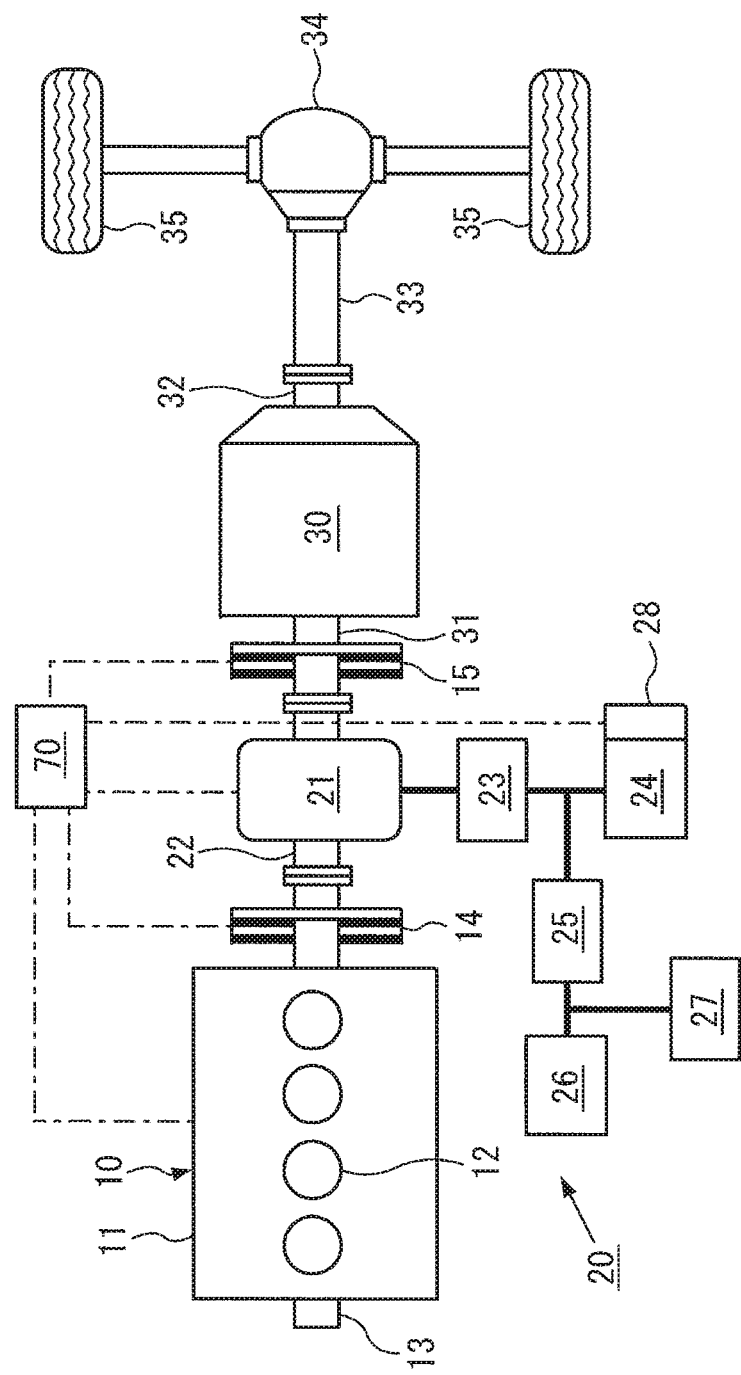

[FIG. 2]
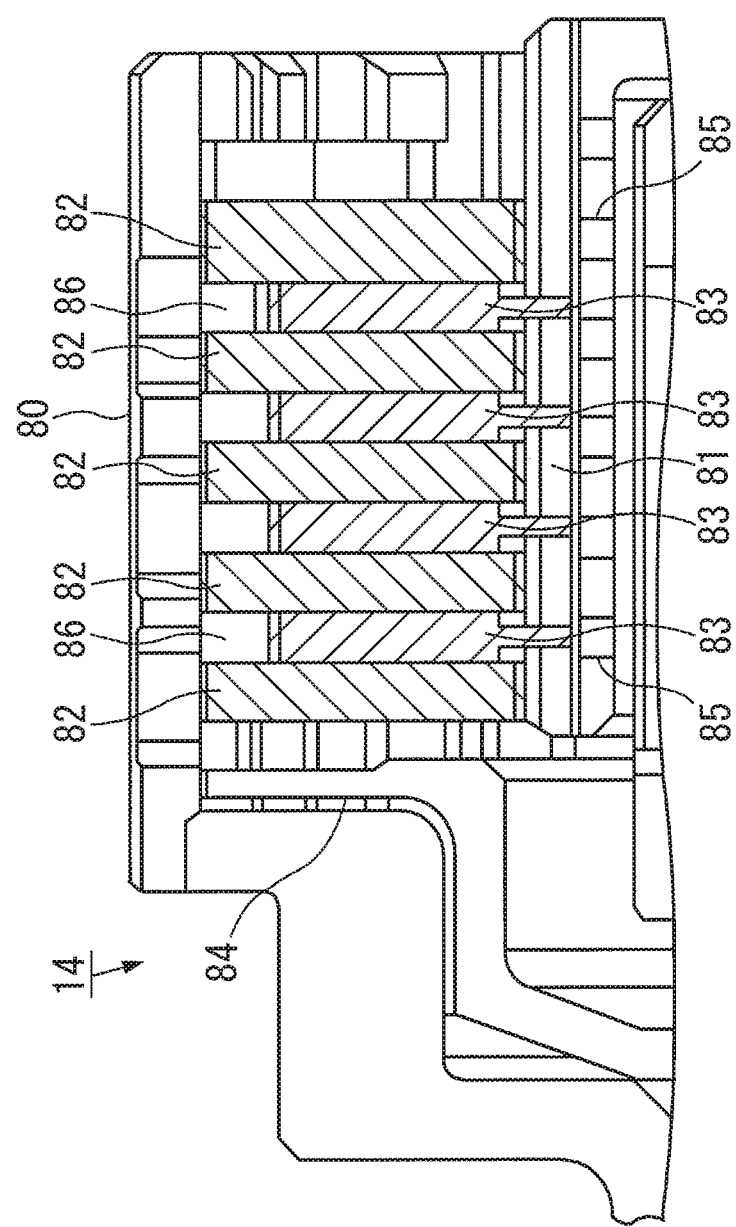

[FIG. 3]
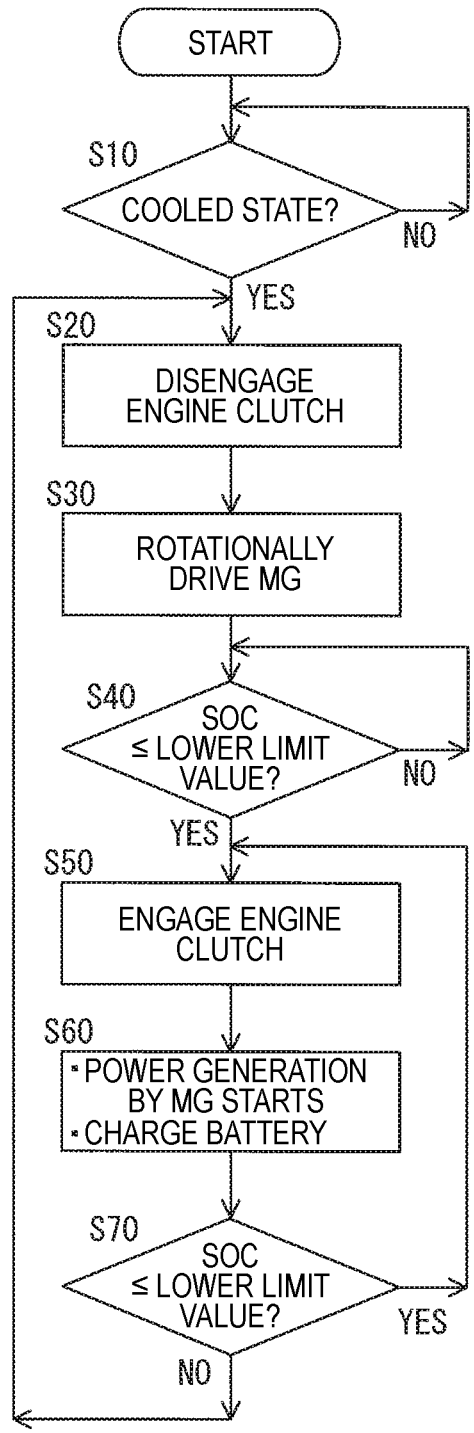

HYBRID VEHICLE

CROSS-REFERENCE TO RELATED APPLICATIONS

This application is a U.S. National Stage entry of PCT Application No: PCT/JP2017/016668 filed on Apr. 27, 2017, which claims priority to Japanese Patent Application No. 2016-089640, filed Apr. 27, 2016, the contents of which are incorporated herein by reference.

TECHNICAL FIELD

The present disclosure relates to a hybrid vehicle, and more specifically relates to a hybrid vehicle that facilitates warm-up of an engine compared with the prior art.

BACKGROUND ART

In recent years, attention has been paid to a hybrid vehicle (hereinafter referred to as "HEV") equipped with a hybrid system having an engine and a motor generator that are compositely controlled according to an operation state of a vehicle in view of fuel efficiency improvement, environmental measures, and the like. With this HEV, a driving force is assisted by the motor generator when the vehicle accelerates or starts, while a battery is charged by regenerative power generation by the motor generator when the vehicle travels inertially or brakes (for example, see PTL 1).

In general, the engine and a transmission in the HEV are connected via a wet clutch. The wet clutch is connected/disconnected during shifting gears in a transmission.

CITATION LIST

Patent Literature

PTL 1: JP-A-2002-238105

SUMMARY OF INVENTION

Technical Problem

However, since the clutch oil has a low temperature and increased viscosity when the hybrid vehicle is in a cooled state, there is a problem that a shock accompanying the connection/disconnection during shifting gears becomes large and the drivability is impaired.

The present disclosure has been made in view of the above, and an object thereof is to provide a hybrid vehicle capable of early reducing a shift shock caused by a wet clutch when the hybrid vehicle is cold.

Solution to Problem

A hybrid vehicle of the present disclosure which achieves the above object is a hybrid vehicle including: an engine and a motor generator that are connected via an engine clutch; a transmission connected to the motor generator via a motor clutch; a battery electrically connected to the motor generator; a hybrid system including the motor generator and the battery; and a control device, in which the control device is configured to bring the engine clutch to a disengaged state and cause electrical power to be supplied to the motor generator from the battery to rotationally drive the motor generator when the hybrid vehicle is in a cooled state.

Advantageous Effects of Invention

According to the hybrid vehicle of the present disclosure, when the hybrid vehicle is in a cooled state, the engine clutch is disengaged, and since a plate in the clutch is rotated by the motor generator to agitate clutch oil and raise temperature thereof to warm up the engine clutch, a shift shock caused by a wet clutch can be reduced early.

BRIEF DESCRIPTION OF DRAWINGS

FIG. 1 is a configuration diagram of a hybrid vehicle according to an embodiment of the present disclosure.

FIG. 2 is a sectional view showing a structure of a wet multi-disc clutch.

FIG. 3 is a flowchart illustrating functions of a control device in a hybrid vehicle according to an embodiment of the present disclosure.

DESCRIPTION OF EMBODIMENTS

Hereinafter, embodiments of the present disclosure will be described with reference to the drawings. FIG. 1 shows a hybrid vehicle according to an embodiment of the present disclosure.

The hybrid vehicle (hereinafter referred to as "HEV".) is a common passenger vehicle or a large automobile such as a bus or a truck, and mainly includes an engine 10, a motor generator 21, a transmission 30, and a hybrid system 20 that complexly controls a vehicle according to the operation state.

In the engine 10, the crankshaft 13 is rotationally driven by thermal energy generated by combustion of fuel in a plurality (four in this example) of cylinders 12 formed in an engine body 11. A diesel engine or a gasoline engine is used for the engine 10. The engine body 11 is cooled by an engine cooling circuit in which cooling water circulates. The engine cooling circuit is provided with a cooling water temperature sensor (not illustrated) that detects water temperature of the cooling water. An outside air temperature sensor (not illustrated) is attached to the vehicle.

One end of the crankshaft 13 is connected to one end of a rotary shaft 22 of the motor generator 21 via an engine clutch 14 consisting of a wet multi-disc clutch. For example, as illustrated in FIG. 2, the engine clutch 14 includes a cylindrical case 80, a cylindrical hub 81 arranged coaxially in the case 80, a large-diameter annular separate plate 82 and a small-diameter annular friction plate 83 arranged alternately along an axial direction between the case 80 and the hub 81, and a hydraulic piston 84 capable of pressing the separate plate 82 and the friction plate 83 in the axial direction. The separate plate 82 and the friction plate 83 movably engage with an inner peripheral surface of the case 80 and an outer peripheral surface of the hub 81 in the axial direction, respectively. The space between the case 80 and the hub 81 is filled with clutch oil 86 supplied from a supply port 85 formed in the hub 81. A clutch oil temperature sensor (not illustrated) that detects oil temperature of the clutch oil 86 is provided.

One of the case 80 and the hub 81 is connected to the crankshaft 13, and the other is connected to the rotary shaft 22. In the engine clutch 14, when the separate plate 82 and the friction plate 83 are pressed in the axial direction by the piston 84 and are frictionally engaged with each other, the case 80 and the hub 81 are fastened to be engaged with each other and power is transmitted. On the other hand, when the pressing by the piston 84 is released, the case 80 and the hub 81 are released to be disengaged and the power is cut off.

A permanent magnet type alternating current synchronous motor capable of performing generating operation is used for the motor generator 21. The other end of the rotary shaft 22 of the motor generator 21 is connected to an input shaft 31 of the transmission 30 through a motor clutch 15 (for example, a wet multi-disc clutch or the like).

An AMT or AT that automatically shift gears to a target gear position that is determined based on an operating state of an HEV and predetermined map data is used for the transmission 30. The transmission 30 is not limited to an automatic gear shifting type as AMT, and may be a manual type in which a driver shifts gears manually.

Rotational power shifted by the transmission 30 is transmitted to a differential 34 through a propeller shaft 33 connected to an output shaft 32, and is distributed as a driving force separately to a pair of drive wheels 35 which are rear wheels.

The hybrid system 20 includes a motor generator 21, an inverter 23 electrically connected to the motor generator 21, a high-voltage battery 24, a DC/DC converter 25, and a low-voltage battery 26.

Preferred examples of the high-voltage battery 24 include a lithium ion battery, a nickel-hydrogen battery, or the like. A lead battery is used for the low-voltage battery 26.

The DC/DC converter 25 has a function of controlling a direction of charge/discharge and an output voltage between the high-voltage battery 24 and the low-voltage battery 26. The low-voltage battery 26 supplies electric power to various vehicle electrical components 27.

Various parameters in the hybrid system 20, such as an electric power value and a state of charge (SOC) of the battery, are detected by a battery management system (BMS) 28.

The engine 10 and the hybrid system 20 are controlled by a control device 70. Specifically, the hybrid system 20 assists at least a part of the driving force by the motor generator 21 supplied with electric power from the high-voltage battery 24 when the HEV starts or accelerates, while the hybrid system 20 performs regenerative power generation by the motor generator 21 and charges the high-voltage battery 24 by converting redundant kinetic energy generated in the propeller shaft 33 and the like into electric power when the HEV travels inertially or brakes. In the HEV, since the engine clutch 14 is disengaged and the motor clutch 15 is engaged, only the motor generator 21 is used as a driving source, and so-called motor single traveling is possible.

Function of the control device 70 in such an HEV will be described below based on FIG. 2. The control device 70 is connected to each of the engine clutch 14, the motor clutch 15, BMS28, and the like through signal lines (indicated by alternate long and short dash lines).

When the HEV is traveling or stopping (idle state), the control device 70 determines whether the HEV is in a cooled state or not, and specifically whether warm-up of the engine clutch 14 is necessary or not based on at least one selected from water temperature of the cooling water in the engine cooling circuit, oil temperature of the clutch oil 86, outside air temperature, and the like (S10). When the HEV is in a cooled state, the control device 70 disengages the engine clutch 14 (S20) and supplies electric power from the high-voltage battery 24 to the motor generator 21 to rotationally drive the motor generator 21 (S30). Accordingly, in the engine clutch 14, since the separate plate 82 or the friction plate 83 rotates together with the rotary shaft 22, the clutch oil 86 is stirred and temperature thereof rises.

At this time, the motor clutch 15 is engaged when the HEV is traveling, and the HEV is in the motor single traveling state. On the other hand, when the HEV is stopping, the motor clutch 15 is disengaged, and the motor generator 21 is in an idling state.

Next, the control device 70 compares the SOC value of the high-voltage battery 24 acquired through the BMS28 with a predetermined lower limit SOC value (S40). The lower limit SOC value of the high-voltage battery 24 is a lower limit value in a recommended use range defined from specifications of the battery, and is, for example, a value in a range of about 20% to 30% in a case of a lithium ion battery.

Then, when the SOC value of the high-voltage battery 24 is equal to or less than the lower limit SOC value, the control device 70 engages the engine clutch 14 (S50), and starts power generation by rotationally driving the motor generator 21 by the driving force of the engine 10 (the engine is started in the motor single traveling state) to charge the high-voltage battery 24 (S60). Accordingly, since both the separate plate 82 and the friction plate 83 rotate, the clutch oil 86 is agitated and the temperature thereof further rises.

Subsequently, the control device 70 monitors the SOC value of the high-voltage battery 24 (S70), and returns to step 20 when the SOC value exceeds the lower limit SOC value. Accordingly, in step 30 and step 60, the clutch oil 86 is agitated and the temperature thereof rises.

In this way, when the HEV is in a cooled state, the engine clutch 14, which is a wet multi-disc clutch, is disengaged, and since plates 82/83 in the clutch are rotated by the motor generator 21 to agitate clutch oil 86 and raise temperature thereof to warm up the engine clutch, a shift shock caused by the wet clutch can be reduced early.

The present invention is based on Japanese Patent Application No. 2016-089640 filed on Apr. 27, 2016, contents of which are incorporated herein as reference.

INDUSTRIAL APPLICABILITY

The present invention has an effect that a shift shock caused by a wet clutch can be reduced early, and is useful for a hybrid vehicle or the like.

REFERENCE SIGNS LIST

10: engine
14: engine clutch
15: motor clutch
20: hybrid system
21: motor generator
24: high-voltage battery
82: separate plate
83: friction plate
86: clutch oil

The invention claimed is:
1. A hybrid vehicle comprising:
an engine and a motor generator that are connected via an engine clutch;
a transmission connected to the motor generator via a motor clutch;
a battery electrically connected to the motor generator;
a hybrid system including the motor generator and the battery; and
a control device,
wherein the control device is configured to bring the engine clutch to a disengaged state and cause electrical power to be supplied to the motor generator from the battery to rotationally drive the motor generator when the hybrid vehicle is in a cooled state, and wherein when the engine clutch is in an engaged state, and the hybrid vehicle is traveling or is in an idle operation state, the control device controls the engine clutch to bring the engine clutch from the engaged state to the disengaged state when the control device determines that the hybrid vehicle is in a cooled state.

2. The hybrid vehicle according to claim 1, further comprising:

an engine cooling circuit in which cooling water circulates, wherein the control device configured to determine whether the hybrid vehicle is in the cooled state based on at least one selected from water temperature of the cooling water, oil temperature of clutch oil of the engine clutch, and ambient temperature.

3. The hybrid vehicle according to claim 1, wherein the control device is configured to, when an SOC of the battery is equal to or less than a predetermined lower limit SOC value, bring the engine clutch to the engaged state and start power generation by rotationally driving the motor generator with the engine to charge the battery.

4. The hybrid vehicle according to claim 1, wherein the control device is configured to bring the motor clutch to the engaged state to bring the hybrid vehicle to a motor single traveling state.

5. The hybrid vehicle according to claim 1, wherein the engine clutch includes a large-diameter separate plate and a small-diameter friction plate.

6. The hybrid vehicle according to claim 5, wherein the separate plate and the friction plate are alternately arranged.

* * * * *